United States Patent
Zhang et al.

(10) Patent No.: US 7,050,576 B2
(45) Date of Patent: May 23, 2006

(54) DOUBLE TALK, NLP AND COMFORT NOISE

(75) Inventors: Yimin Zhang, Boyds, MD (US);
Bogdan Kosanovic, Bethesda, MD (US)

(73) Assignee: Texas Instruments Incorporated, Dallas, TX (US)

( * ) Notice: Subject to any disclaimer, the term of this patent is extended or adjusted under 35 U.S.C. 154(b) by 266 days.

(21) Appl. No.: 10/223,443

(22) Filed: Aug. 20, 2002

(65) Prior Publication Data
US 2004/0037419 A1 Feb. 26, 2004

(51) Int. Cl.
*H04M 9/08* (2006.01)

(52) U.S. Cl. .......................... 379/406.07; 379/406.08; 379/406.03

(58) Field of Classification Search .............................. 379/406.01–406.16
See application file for complete search history.

(56) References Cited

U.S. PATENT DOCUMENTS

| | | | | |
|---|---|---|---|---|
| 6,125,179 A | * | 9/2000 | Wu | 379/388.01 |
| 6,424,635 B1 | * | 7/2002 | Song | 370/286 |
| 6,694,019 B1 | * | 2/2004 | Song | 379/406.04 |
| 6,738,358 B1 | * | 5/2004 | Bist et al. | 370/289 |
| 2002/0080730 A1 | * | 6/2002 | LeBlanc | 370/286 |

* cited by examiner

*Primary Examiner*—Fan Tsang
*Assistant Examiner*—Ramnandan Singh
(74) *Attorney, Agent, or Firm*—Abdul Zindani; Wade James Brady, III; Frederick J. Telecky, Jr.

(57) ABSTRACT

A state machine for attenuating the transition into and out of NLP state to reduce voice clipping and to reduce echo leak in a voice over packet signal transmission. The state machine interposes two additional transitional states between the NLP active state and the NLP inactive state to eliminate the sharp transition of NLP activity. An NLP entering state is used to gradually reduce the mixing ratio of echo and voice to attenuate the transition from passage of echo in the NLP inactive state to the suppression of echo in the NLP active state. An NLP exiting state is used to gradually increase (ramping the change) the mixing ratio of echo and voice to attenuate the transition from suppression of echo in the NLP active state to passage of echo in the NLP inactive state. The rate of increase/decrease, the transition rate is determined based upon the signal parameters, including the presence of double talk and a transition rate indicator based upon these factors is generated in software to control the transition rate.

20 Claims, 3 Drawing Sheets

Echo Leak

Voice Clipping

Reduced Echo Leak

Attenuated Voice Clipping

DOUBLE TALK, NLP AND COMFORT NOISE

FIELD OF THE INVENTION

The invention relates to double talk detection and the application and/or disengagement of NLP logic for the enhanced processing of voice over packet speech including echo cancellation. Specifically, the present invention relates to enhanced differentiation of echo and double talk and the introduction of intermediate states to reduce echo leak and speech clipping.

BACKGROUND OF THE INVENTION

FIG. 1 illustrates a simplified block diagram of an equipment configuration for one terminal of a communication link which includes a near end hybrid. The communication link has a near-end 8 comprising a telephone 2, a four-to-two wire hybrid circuit 3, an echo canceller circuit 4, a filter 5 and a NLP 6. A far-end connected to communication network 23, can be similarly configured but is not illustrated in FIG. 1. During a conversation between the near-end and far-end users, the far end signal, x, which contains both the far-end user's speech and incidental background noise, enters the near-end 8 as signal x at node 9.

FIG. 2 illustrates a representative communication link 20 between two telephones 24 and 25. The link is comprised of a near-end 21, a far-end 22, and a communication network 23 that interconnects the near-end 21 and far-end 22. The near-end 21 has a user telephone 24, a hybrid circuit 26, and an echo canceller circuit 28. Similarly, the far-end 22 has a user telephone 25, a hybrid circuit 27, and an echo canceller circuit 29. Far-end signal power, X, is received by the near-end. Signal Y is the coupled echo signal from the far-end signal as well as the near-end signal produced by telephone 24. This near-end signal contains both the speech of the near-end telephone user and the background noise of the user's environment. Together, the near-end signal and far-end echo signal are represented by Y.

The far-end signal is provided to the four-to-two wire hybrid circuit 3 and then to near-end telephone 2. Due to the unavoidable non-linearities present in the hybrid circuit 3, some portion of the far-end signal power is coupled onto the output 7 of the hybrid circuit 3 as an echo. A composite signal y exists at node 7 containing the echo signal and the combined speech of the near-end user and any incidental background noise from the near-end user's environment. A filter having a filter length period selected and designed to be longer than the hybrid dispersion time is used prior to power level measurements at 7 to allow the echo canceller 4 to operate properly.

Echo canceller 4 synthesizes the expected value e of the echo signal in adaptive filter 5, and subtracts this value at 10 from the composite signal y existing at node 7. The resulting difference signal, d, existing at node 14, is intended to contain only the near-end signal s originating from telephone 2. Ultimately, difference signal, d, is provided to the far-end telephone through the communications network 23.

Methods of measuring the echo return loss typically measure a signal at node 9, where the signal power from the far-end would normally exist. A measurement of the signal power, x, at node 9 is made. Additionally, the power level of the composite signal y, comprised of the coupled echo signal and any signal s generated by the near-end telephone 2, is measured at node 7. The measurement can be made when little-to-no signal is being generated at near end telephone 2. Assuming the signal power of any signal generated by the near-end telephone is very small in comparison to the coupled echo signal power, the ratio of the measured test signal power x to the measured power level y provides an estimate of the echo return loss (ERL) for the near-end 8. The magnitude of echo return loss is usually measured as a difference in dB between signal x and signal y. As described in the co-pending application Ser. No. 10/029,669, incorporated herein in its entirety by reference, echo return loss may be measured dynamically during the course of a telephone conversation.

Echo is an important factor in communications which include a hybrid between a four wire communication network 23 and the end terminals 24 and 25 as illustrated in FIG. 2. When echo is present, it is preferable to eliminate the echo. To eliminate the echo, the magnitude of the echo must be determined. One way of determining the magnitude of the echo is through echo return loss (ERL) estimation. A high echo return loss means that there is very little echo because most of the energy from the far end has been lost when the near end signal combined with echo is measured.

A typical echo canceller, as illustrated in FIG. 1, includes an adaptive finite impulse filter FIR 5. Under the control of an adaptation algorithm, FIR filter 5 models the impulse response of the echo path. A non-linear processor (NLP) 6 can be used to remove residual echo that may remain after linear processing of the input signal. The echo canceller may also typically include a double talk detector 11. Double talk occurs when both far end and near end speech are present at the same time. A double talk detector 11 can also be used to control and inhibit the adaptation process of the FIR 5 and/or the NLP 6 when double talk is present and it may be undesirable to cancel or suppress echo because double talk will be suppressed.

In the echo canceller, the signal y is the perceived near end signal. Signal y is a combination of the actual near end signal s and the echo from the far end signal x which comes through hybrid 3. The output signal d is the signal y less the echo estimate e generated by the adaptive filter 5. The adaptive filter 5 is programmed to generate an output signal e that is as close to the echo as possible so that the echo is largely cancelled by the echo estimate e and the difference signal d closely resembles the generated near end signal s. The NLP 6 controls the amount of signal d that is transmitted to the far end. When there is no near end signal s, or a large echo over riding near end signal is present, NLP 6 can provide comfort noise to the far end instead of near end signal so as to prevent any possible uncancelled echo from being transmitted. When a valid s exists, NLP opens so as to let the far end hear the signal. False detection of a lack of near end signal s can cause clipping of speech and failure to detect echo can result in echo leak through the NLP. The NLP as an on/off switch can result in abrupt audible changes which are undesirable in speech communications.

SUMMARY OF THE INVENTION

The present invention teaches the attenuation of state change of the NLP so that speech is faded instead of clipped and echo leak is minimized and does not appear as a sudden signal change. The present invention teaches the implementation of a state machine to guide the transition into and out of NLP active state and the inclusion of transition states for entry and exit of NLP active and inactive states.

FIGS. 3A to 3D illustrate a situation where there is no near end signal s and only a far end echo. A portion of an exemplary typical echo signal 30 without near end speech, is illustrated in FIG. 3A. If the echo has been properly detected and the NLP 6 is functioning properly, the NLP will be Active and no echo will teak through to the far end. However, if the NLP is in error for a portion of the duration of the echo signal, as illustrated in FIG. 3B by the state change at 32 in NLP state tine 31, then echo leak, as illustrated in FIG. 3C by echo leak line 33, will result. Because of the on/off nature of the prior art NLP operation, the entire echo signal will leak through causing a noticeable audible disruption. The present invention NLP, as detailed below, attenuates leak caused by NLP error resulting in the minimized echo leak illustrated in FIG. 3D as line 34.

FIGS. 4A–4D illustrate the situation where there is a near end signal s. A portion of an exemplary typical near end signal s, is illustrated in FIG. 4A. This signal s will typically represent speech from the near end speaker. When the NLP 6 is functioning properly, the NLP will be Inactive and the entire speech signal will pass through to the far end. However, if the NLP is in error for a portion of the duration of the echo signal, as illustrated in FIG. 4B by the state change at 42 in NLP state line 41, then abrupt clipping of the speech signal 43 will result as illustrated in FIG. 4C. Because of the nature of the prior art NLP operation, the clipping of speech is sharp, causing a noticeable audible disruption. The present invention NLP, as detailed below, attenuates the clipping caused by NLP error resulting in smooth loss of the speech signal illustrated in FIG. 4D as line 44.

Proper identification of double talk also provides for smooth transitions. If there is double talk or an idle in the near end signal s, the NLP will be inactive, otherwise use of active NLP will be evaluated depending on power measurements. The state machine, detailed below, will pass some decisions, for example double talk true or false; NLP=active or inactive. The prior art used NLP as on/off switch. If NLP was active, the near end signal was replaced with comfort noise otherwise the near end signal was left unmodified. The present invention does not implement NLP as a hard switch but instead as a smooth transition. The NLP logic an still make a mistake and be inactive or active at the wrong time. However, the logic state described below smooths the transition by attenuating the signal when there is a NLP transition.

The logic of the state machine of the present invention attenuates the echo instead of sharp removal. Instead of removing echo and all near end noise, the signal level is attenuated down to a level where echo is no longer audible and near end noise and/or signal is preserved and passed to the far end, as illustrated in FIG. 5, which keeps the noise section similar to non-NLP state.

The amount of the calculated attenuation 51 depends on far end power x and combined loss. Echo reduced to −80 dBm is essentially silence level. The calculated attenuation will first apply and then an additional amount of user selectable attenuation 53 can be added towards the target of −80 dBm. The target level can change depending on noise level estimated for near end noise level. If the near end noise level is high the echo signal does not need to be attenuated down to −80 dBm. The echo signal can just be attenuated to a level below the noise level so that echo is just as bad as noise and will not cause problems because the echo will not be distinguishable by the listener. The present invention also provides a user adjustable level 53 to provide a user adjustment. The user adjustment will not allow for amplification of the signal above the original power level x nor will it need to allow for adjustment below −80 dBm.

The user adjustment is provided to allow some control over NLP to provide a selection between non-aggressive NLP to allow the leakage of some minor echo while always having near end noise come through. Other users do not care about near end noise they just want to eliminate all echo so these users desire a more aggressive NLP. The user can achieve zero echo level by setting 53 to −80 dBm. Less attenuation will bring near end noise audible.

Double talk is treated differently by the state machine. If double talk is true than NLP is false. If double talk is false then could still be some weak double talk detection and NLP may be true or false depending on parameters of the state machine. NLP is immediately set inactive if double talk is detected.

The slope of the transition ramp 23' and 42' depends upon the length of time in the double talk state. The logic is that the longer the time in the double talk state, the farther away the double talk is and therefore the steeper slope of the ramp for quicker entry into NLP active state. If double talk detection is recent then double talk may still exist so ramp to NLP is slower, less steep. The logic state machine, FIG. 6, can utilize a software timer as part of the double talk state routine 65 to monitor the duration of the detected double talk period. The logic can also use a software based transition rate indicator having a value based upon the analysis of double talk to control the rate of transition.

BRIEF DESCRIPTION OF THE DRAWINGS

Preferred embodiments of the invention are discussed hereinafter in reference to the drawings, in which.

DETAILED DESCRIPTION OF THE INVENTION

Figure 1:
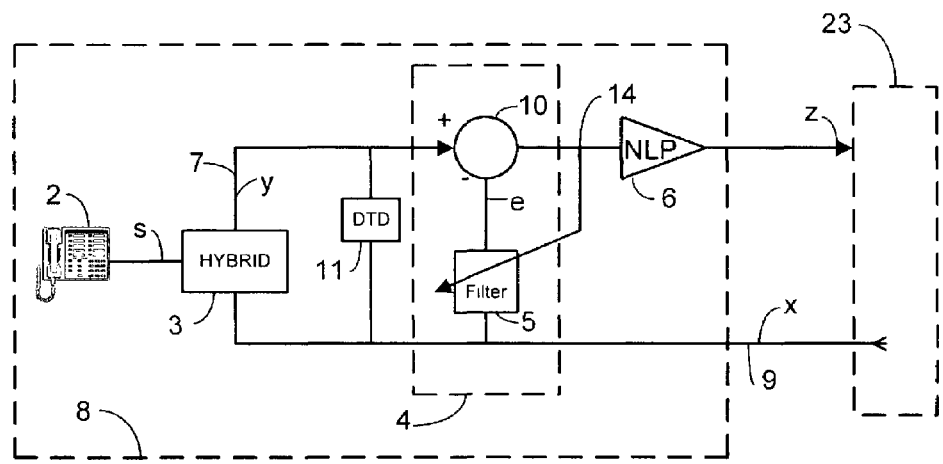
FIG. 1 is a simplified block diagram of one end of a communication link.
Figure 2:
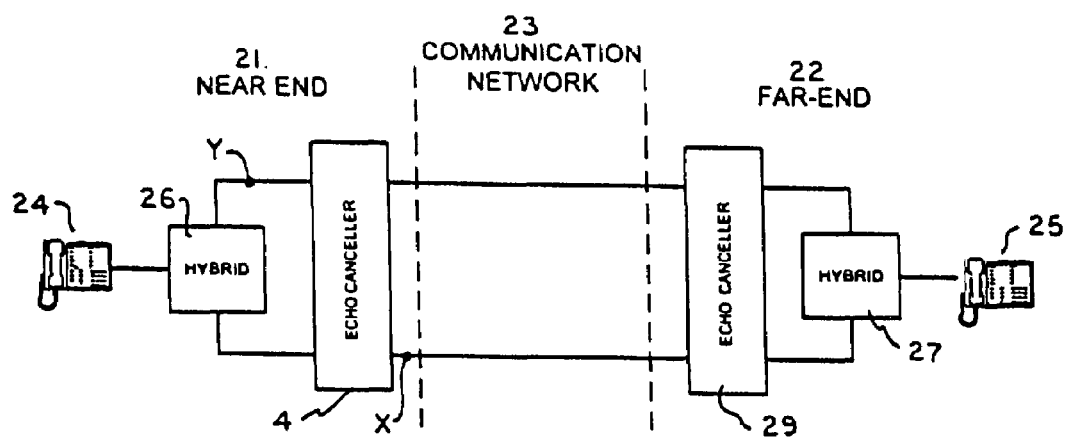
FIG. 2 is a simplified block diagram of a representative communication link between two two wire telephones each attached to the communication link via a hybrid.
Figure 3A:
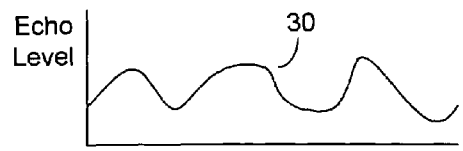
FIG. 3 is a signal diagram of an echo signal and corresponding NLP activation.
Figure 4A:
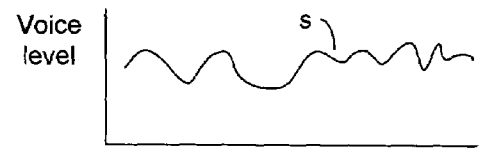
FIG. 4 is a signal diagram of a voice signal and corresponding NLP activation.
Figure 3B:
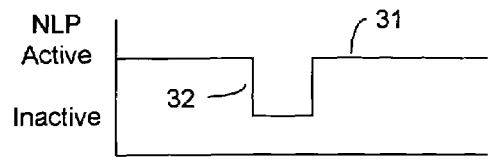
Figure 4B:
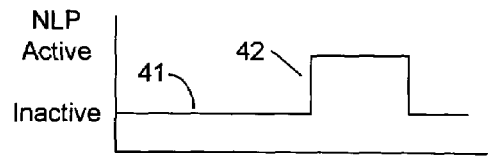
Figure 3C:
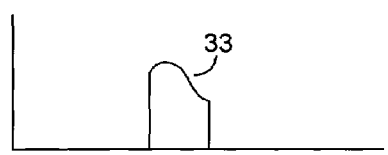
Figure 4C:
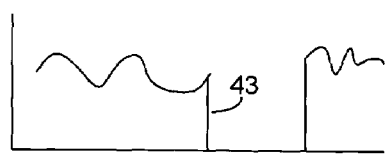
Figure 3D:
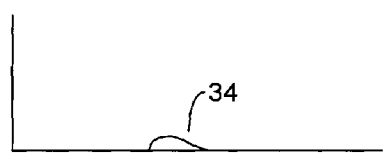
Figure 4D:
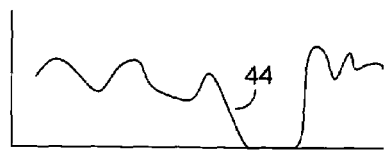
Figure 5:
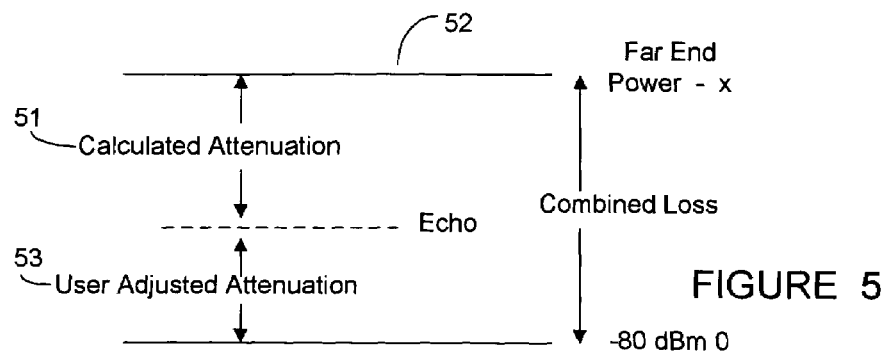
FIG. 5 illustrates power attenuation.
Figure 6:
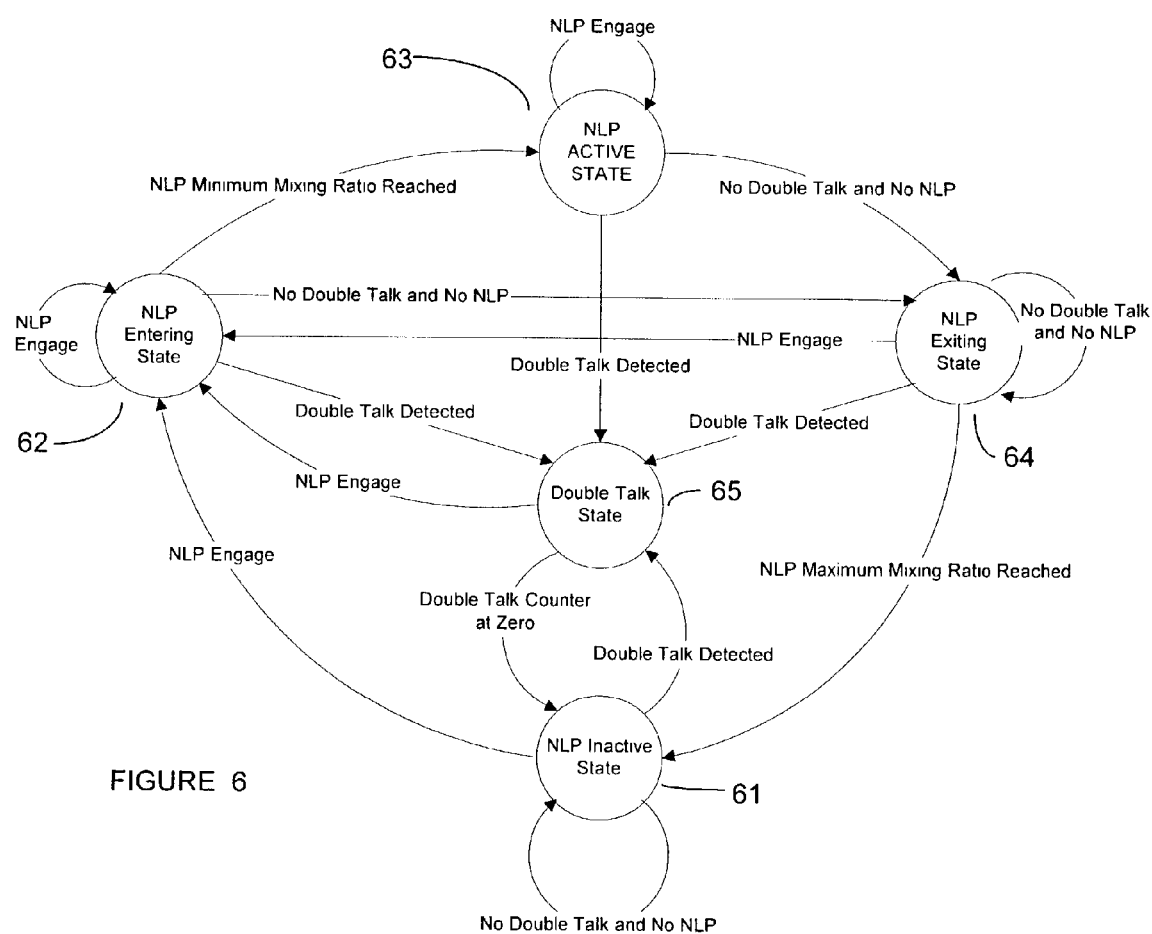
FIG. 6 is a state diagram illustrating the NLP and double talk logic states.

The activity of the NLP is regulated by the state machine illustrated in FIG. 6. If the state machine is in NLP inactive state 61, the state machine must transition through NLP entering state 62 prior to NLP active state 63. Similarly, the state machine must pass through NLP exiting state prior 64 to returning to NLP inactive state 61. Unless double talk is detected. If double talk is detected, the state machine will first pass through double talk state 65. When in the NLP entering state 62, the NLP will idle in this state until the NLP minimum mixing ratio has been reached. This allows the engagement of the NLP to be attenuated instead of abrupt, to avoid sudden voice clipping, such as illustrated at 42 in FIG. 4.

When in the NLP existing exiting state, the NLP will idle until the NLP maximum mixing ratio has been reached, allowing the disengagement of NLP to be attenuated instead of abrupt. This reduces echo leak as illustrated in FIG. 3.

In the NLP active state, the NLP prevents echo as in the prior art. The minimum mixing ratio and mixing at minimum ratio are updated. If double talk is detected, the state machine transitions to NLP double talk out state, and a counter is initiated to monitor the time in double talk state. If no double talk is detected, the state machine transitions to NLP going out state In NLP entering state 62, the NLP is engaged and the mixing ratio is gradually decreased. By decreasing the mixing ratio of noise to voice, the suppression of echo/noise is gradual or attenuated, not sharp as in the prior art. The, mixing ratio continues to be decreased while in the NLP entering state until a condition exists to shift the state machine into a different state. Then, if double talk is detected, the state machine shifts to Double Talk state 65 and the double talk counter is initialized. If no double talk is detected and the NLP is not engaged, the state machine instead shifts to NLP exiting state 64 and the mixing ratio is gradually increased to allow more echo/noise into the voice stream. If however, the NLP minimum mixing ratio is reached while the state machine is still in NLP entering state 62, the state machine switches to NLP active state 63.

When in NLP exiting state 64, the NLP is engaged and the mixing ratio of noise to voice is increased. This allows for an attenuated transition back from an NLP active echo suppression to a non-active NLP pass through. If double talk is detected, the state machine shifts to the double talk state 65 and the double talk counter is initialized. If a new condition to engage NLP is received, then the state machine shifts back to NLP entering state 62. When the NLP maximum mixing ratio is reached and the state machine is still in NLP exiting sates 64, the state machine will shift to NLP inactive state.

When the state machine is shifted into the double talk state, the NLP is disengaged and the double talk hangover count is decreased. The double talk hangover count sets the amount of time that the state machine should remain in double talk state 65 after receipt of a double talk signal. As long as double talk is detected, the state machine will remain in the double talk state 65 and the double talk counter is reset. When the state machine is in double talk state and no double talk is detected, the double talk hangover counter counts down during the elapsing time period. The double talk counter indicates the elapsed time since the last double talk detection. If an NLP engage event is detected, the state machine shifts to NLP entering state and recalculates a ramping rate for the decrease of the mixing ratio based upon the relationship between the current double talk hangover and the initial double talk hangover. The ramping rate is used in NLP entering state 62 and NLP exiting state 64 to determine the speed of decrease or increase in mixing ratio. If the double talk counter reaches zero the state machine will exit from the double talk state 65 and shift to NLP inactive state.

In the NLP inactive state 61, the NLP is disengaged. if double talk is detected, the state machine shifts to double talk state 65 and an initial double talk hangover countdown counter is set. If an NLP event, such as echo detection, occurs, the state machine shifts to NLP entering state and begins decreasing the mixing ratio at a ramping rate set to Ri=Ri0. If no double talk, NLP or echo is detected, the state machine remains in NLP inactive state.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method of echo cancellation in a communication link by controlling a mixing ratio between an echo signal and a near-end voice signal, whereby changing the mixing ratio changes the degree of suppression of the echo, comprising:
   detecting echo signals in a communication link having voice signals; and
   suppressing the echo signals according to a first ramping rate that is determined by a decrease in a mixing ratio of the echo signals to the voice signals;
   wherein the mixing ratio decreases over time to attenuate the suppressing of the echo signals, such that the first ramping rate increases until reaching a minimum mixing ratio of the echo signals to the noise signals resulting in echo suppression.

2. The method of claim 1, further comprising:
   transitioning out of the suppressing the echo signals, after the echo signals are suppressed to a target noise level, according to a second ramping rate, that is determined by ratio of an increase in a mixing ratio of the echo signals to the voice signals
   wherein the mixing ratio increases over time to attenuate the transition out of the suppressing of the echo signals,
   wherein the second ramping rate decreases until reaching a maximum mixing ratio of the echo signals to the noise signals.

3. The method of claim 2, further comprising:
   entering a double talk state if double-talk is detected while performing the transitioning in the communication link; and
   initiating a double-talk counter, while in the double-talk state, for monitoring a time elapsed since an initial double-talk hangover and a current double-talk hangover.

4. The method of claim 3, further comprising:
   exiting the double-talk state and returning to the suppressing if echo signals are detected in the communication link while in the double-talk state; and
   recalculating the second ramping rate for the increase of the mixing ratio based upon a relationship between the current double-talk hangover and the initial double-talk hangover.

5. The method of claim 3, wherein the second ramping rate depends upon a length of the monitoring time recorded in the double talk counter.

6. The method of claim 2, wherein the second ramping rate is used to determine a speed of increase in the mixing ratio.

7. The method of claim 2, further comprising:
   updating the maximum mixing ratio after the minimum mixing ratio is reached according to the first ramping rate of the suppressing and after the suppressing step attenuates the echo signals to a target near-end noise level.

8. The method of claim 1, further comprising:
   entering a double talk state if double-talk is detected in the communication link; and
   initiating a double-talk counter, while in the double-talk state, for monitoring a time elapsed since an initial double-talk hangover and a current double-talk hangover.

9. The method of claim 8, further comprising:
   exiting the double-talk state and returning to the suppression of the echo signals if echo signals are detected in the communication link while in the double-talk state; and recalculating the ramping rate for the decrease of the mixing ratio based upon a relationship between the current double-talk hangover and the initial double-talk hangover.

10. The method of claim 8, wherein the first ramping rate depends upon a length of the monitoring time recorded in the double talk counter.

11. The method of claim 1, wherein the first ramping rate is used to determine a speed of decrease in the mixing ratio.

12. The method of claim 1, further comprising:
updating the minimum mixing ratio after the minimum mixing ratio is reached according to the first ramping rate of the suppressing and after the suppressing step attenuates the echo signals to a target near-end noise level.

13. The method of claim 1, wherein the suppressing is performed without providing comfort noise generation signals in said communication link.

14. The method of claim 1, wherein the suppressing is performed by executable software instructions on a processor operably connected to the communication link.

15. A state machine within a signal processing system of enhanced control of an non-linear processor (NLP) used for reduction of echo, which has been detected in said signal processing system, comprising:
an NLP active state wherein said echo is suppressed;
an NLP inactive state wherein said echo is not suppressed;
an NLP entering state interposed between said NLP inactive state and said NLP state, for controlling activation of said NLP,
wherein the echo signals are suppressed in the NLP entering state according to a first ramping rate that is determined by a decrease in a mixing ratio of the echo signals to voice signals,
wherein the mixing ratio decreases over time to attenuate the suppression of the echo signals, such that the first ramping rate increases until reaching a minimum mixing ratio of the echo signals to the noise signals; and
an NLP exiting state interposed between said NLP active state and said NLP inactive state, for controlling deactivation of said NLP,
wherein a transitioning out of the NLP active state is performed according to a second ramping rate, that is determined by ratio of an increase in a mixing ratio of the echo signals to the voice signals
wherein the mixing ratio increases over time to attenuate the transition out of the NLP active state, and the second ramping rate decreases until reaching a maximum mixing ratio of the echo signals to the noise signals.

16. The state machine of claim 15, further including:
a double talk detection algorithm that detects double talk in the signal processing system;
a timer/counter that is initialized upon detection of double talk, when said NLP is in said NLP inactive state;
an NLP engage transition rate indicator having a value for determining a rate of said activation of said NLP, upon resumption of echo suppression after loss of detection of double talk.

17. A device for performing echo cancellation in a communication link, comprising:
a non-linear processor (NLP) having executable computer instructions that perform the steps of:
detecting echo signals in a communication link having voice signals; and
suppressing the echo signals according to a first ramping rate that is determined by a decrease in a mixing ratio of the echo signals to the voice signals;
wherein the mixing ratio decreases over time to attenuate the suppressing of the echo signals, such that the first ramping rate increases until reaching a minimum mixing ratio of the echo signals to the noise signals resulting in echo suppression.

18. The device of claim 17, wherein the NLP further performs the steps of:
transitioning out of the suppressing the echo signals, after the echo signals are suppressed to a target noise level, according to a second ramping rate, that is determined by ratio of an increase in a mixing ratio of the echo signals to the voice signals
wherein the mixing ratio increases over time to attenuate the transition out of the suppressing of the echo signals,
wherein the second ramping rate decreases until reaching a maximum mixing ratio of the echo signals to the noise signals.

19. The device of claim 17, wherein the NLP further performs the steps of:
entering a double talk state if double-talk is detected in the communication link; and
initiating a double-talk counter, while in the double-talk state, for monitoring a time elapsed since an initial double-talk hangover and a current double-talk hangover.

20. The method of claim 17, wherein the NLP further performs the steps of:
exiting the double-talk state and returning to the suppression of the echo signals if echo signals are detected in the communication link while in the double-talk state; and
recalculating the first ramping rate for the decrease of the mixing ratio based upon a relationship between the current double-talk hangover and the initial double-talk hangover,
wherein the first ramping rate depends upon a length of the monitoring time recorded in the double talk counter.

* * * * *